(12) United States Patent
Hwang et al.

(10) Patent No.: US 9,516,607 B2
(45) Date of Patent: Dec. 6, 2016

(54) METHOD FOR DETERMINING TRANSMISSION POWER

(71) Applicant: LG ELECTRONICS INC., Seoul (KR)

(72) Inventors: Daesung Hwang, Seoul (KR); Ilmin Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/532,885

(22) Filed: Nov. 4, 2014

(65) Prior Publication Data

US 2015/0126241 A1    May 7, 2015

Related U.S. Application Data

(60) Provisional application No. 61/901,434, filed on Nov. 7, 2013.

(51) Int. Cl.
*H04B 7/00* (2006.01)
*H04W 52/26* (2009.01)
*H04W 52/20* (2009.01)

(52) U.S. Cl.
CPC .......... *H04W 52/267* (2013.01); *H04W 52/20* (2013.01)

(58) Field of Classification Search
CPC .... H04W 52/20; H04W 52/267; H04W 52/36; H04W 52/38
USPC ......................................... 455/522
See application file for complete search history.

(56) References Cited

U.S. PATENT DOCUMENTS

| | | | |
|---|---|---|---|
| 2007/0149237 A1* | 6/2007 | Russell | H04W 52/28 455/522 |
| 2008/0102881 A1* | 5/2008 | Han | H01Q 3/30 455/522 |
| 2011/0246854 A1* | 10/2011 | McLaughlin | H03M 13/01 714/758 |
| 2013/0077514 A1* | 3/2013 | Dinan | H04L 5/0057 370/252 |

* cited by examiner

*Primary Examiner* — Wesley Kim
*Assistant Examiner* — Raj Chakraborty
(74) *Attorney, Agent, or Firm* — Lee, Hong, Degerman, Kang & Waimey

(57) ABSTRACT

There is a provided a method for deciding transmission power to securely transmit data, the method comprising: determining a transmission rate toward an intended receiver, based on an upper limit of a decoding error probability of the intended receiver and a lower limit of a decoding error probability of an unwanted over hearer; and deciding a transmission power toward the intended receiver based on the upper limit and the lower limit. Here, if the upper limit is lower than the lower limit, the transmission toward the intended receiver is not performed.

4 Claims, 9 Drawing Sheets

FIG. 4
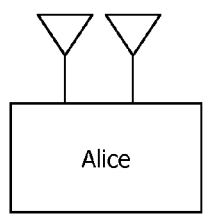 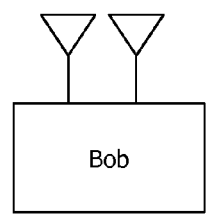 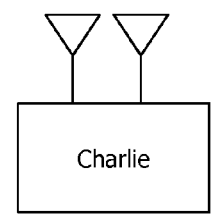

FIG. 7

```
┌─────────────────────────────────────────────────────┐
│ Use an equation (121) to securely transmit data     │
│              without being overheard                │
└─────────────────────────────────────────────────────┘
                          │
                          ▼
┌───────────────────────────────────────────────────────────────┐
│                     Power optimization                        │
│ •When a channel is slowly changed,                            │
│     power is optimized by equation (126) and (128) in order   │
│ to minimize an outage probability                             │
│ •When a channel is rapidly changed,                           │
│    power is optimized by equation (126) and (128) in order to │
│ maximize an outage probability                                │
│ •When a channel is rapidly changed,                           │
│    power is optimized by equation (145) and (147) in order to │
│ maximize an outage probability                                │
└───────────────────────────────────────────────────────────────┘
```

METHOD FOR DETERMINING TRANSMISSION POWER

CROSS-REFERENCE TO RELATED APPLICATIONS

Pursuant to 35 U.S.C. §119(e), this application claims the benefit of U.S. Provisional Patent Application Ser. No. 61/901,434, filed on Nov. 7, 2013, the contents of which are hereby incorporated by reference herein in its entirety.

TECHNICAL FIELD

The present invention relates to a method for determining transmission power.

BACKGROUND ART

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors). A terminal (user equipment, UE) 10 may be fixed or movable and may be called other terms such as a mobile station (MS), a mobile terminal (MT), a user terminal (UT), a subscriber station (SS), a wireless device, a personal digital assistant (PDA), a wireless modem, a handheld device, and the like. The base station 20 generally represents a fixed station that communicates with the terminal 10, and may be called different terms such as an evolved-NodeB (eNB), a base transceiver system (BTS), an access point, and the like.

The terminal generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the terminal.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Meanwhile, transmission power is a key matter to decide a cell coverage. However, when the transmission power is increased, since the transmission power is overheard by a third person, the transmission power may not be thoughtlessly increased.

DISCLOSURE OF THE INVENTION

Therefore, one disclosure of the specification is to provide techniques for optimizing transmission power.

To achieve these and other advantages and in accordance with the purpose of the present invention, as embodied and broadly described herein, there is provided a method for deciding transmission power to securely transmit data, the method comprising: determining a transmission rate toward an intended receiver, based on an upper limit of a decoding error probability of the intended receiver and a lower limit of a decoding error probability of an unwanted overhearer; and deciding a transmission power toward the intended receiver based on the upper limit and the lower limit. Here, if the upper limit is lower than the lower limit, the transmission toward the intended receiver is not performed.

If the upper limit is greater than the lower limit, the transmission power may be decided based on a water-filling power control scheme.

The upper limit of the decoding error probability of the intended receiver may be lower than a first threshold value.

The lower limit of the decoding error probability of the unwanted overhearer may be greater than a second threshold value.

In the decision step, the transmission power toward the intended receiver may be decided in consideration of a minimization of an outage probability of the unwanted overhearer.

BRIEF DESCRIPTION OF THE DRAWINGS

FIG. 4 shows a concept of a communication system by an information theory.

FIG. 7 illustrates a method of securely transmitting wireless data in a bit error probability aspect

MODES FOR CARRYING OUT THE PREFERRED EMBODIMENTS

Figure 1:
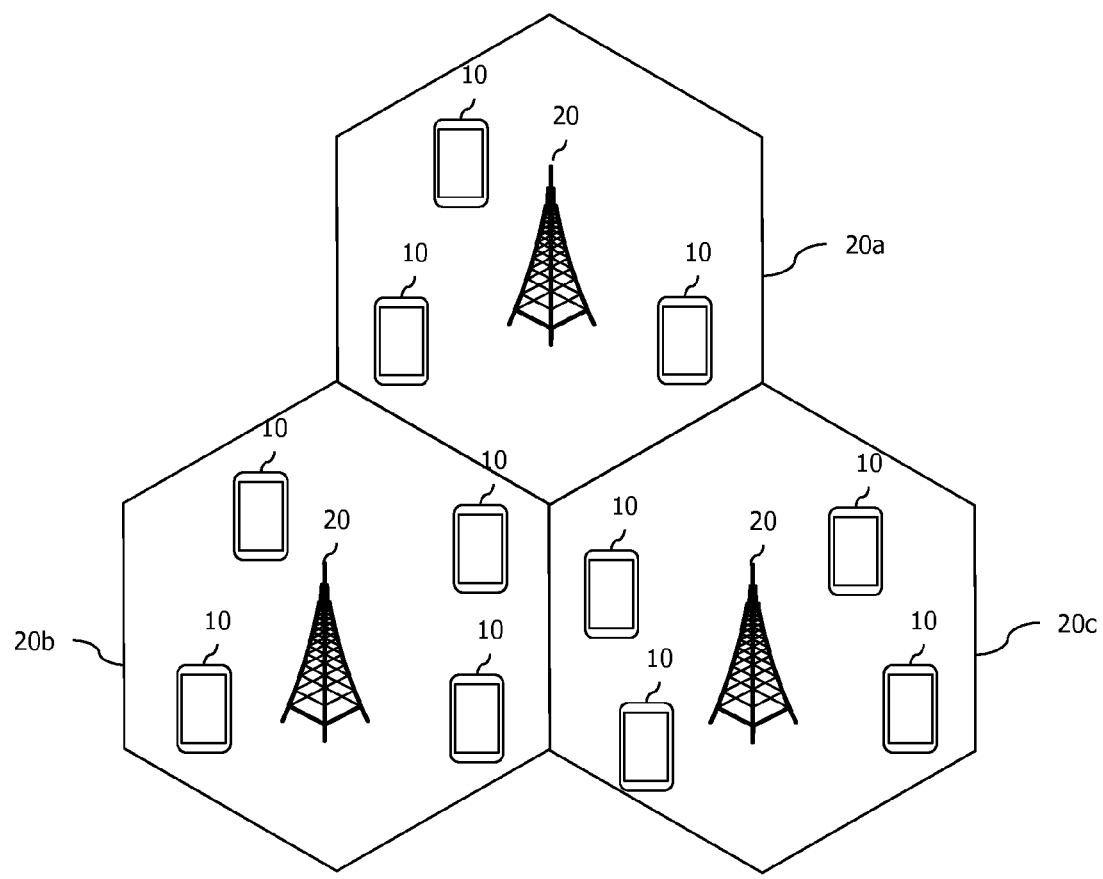
FIG. 1 is view of an evolved mobile communication network.

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

The present invention will be described on the basis of a universal mobile telecommunication system (UMTS) and an evolved packet core (EPC). However, the present invention is not limited to such communication systems, and it may be also applicable to all kinds of communication systems and methods to which the technical spirit of the present invention is applied.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed there between. On the contrary, in case where an element is "directly connected" or "directly linked" to another element, it should be understood that any other element is not existed there between.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

There is an exemplary terminal in accompanying drawings, however the terminal may be referred to as terms such as a user equipment (UE), a mobile equipment (ME), a mobile station (MS), a user terminal (UT), a subscriber station (SS), a wireless device (WD), a handheld device (HD), an access terminal (AT), and etc. And, the terminal may be implemented as a portable device such as a notebook, a mobile phone, a PDA, a smart phone, a multimedia device, etc, or as an unportable device such as a PC or a vehicle-mounted device.

The 3GPP LTE uses an orthogonal frequency division multiple access (OFDMI) in a downlink and a single carrier-frequency division multiple access (SC-FDMI) in an uplink. The OFDM needs to know in order to understand the OFDMA. The OFDM may be used since an inter-symbol interference effect can be reduced due to low complexity. The OFDM converts data to be input in serial into N parallel data and transmits it by carrying N orthogonal sub-carriers. The sub-carriers maintains orthogonally in a frequency dimension. Meanwhile, the OFDMA means a multiple access method to realize multiple accesses by providing a part of the available sub-carrier to each user independently, in a system using the OFDM in a modulation scheme.

Figure 2:
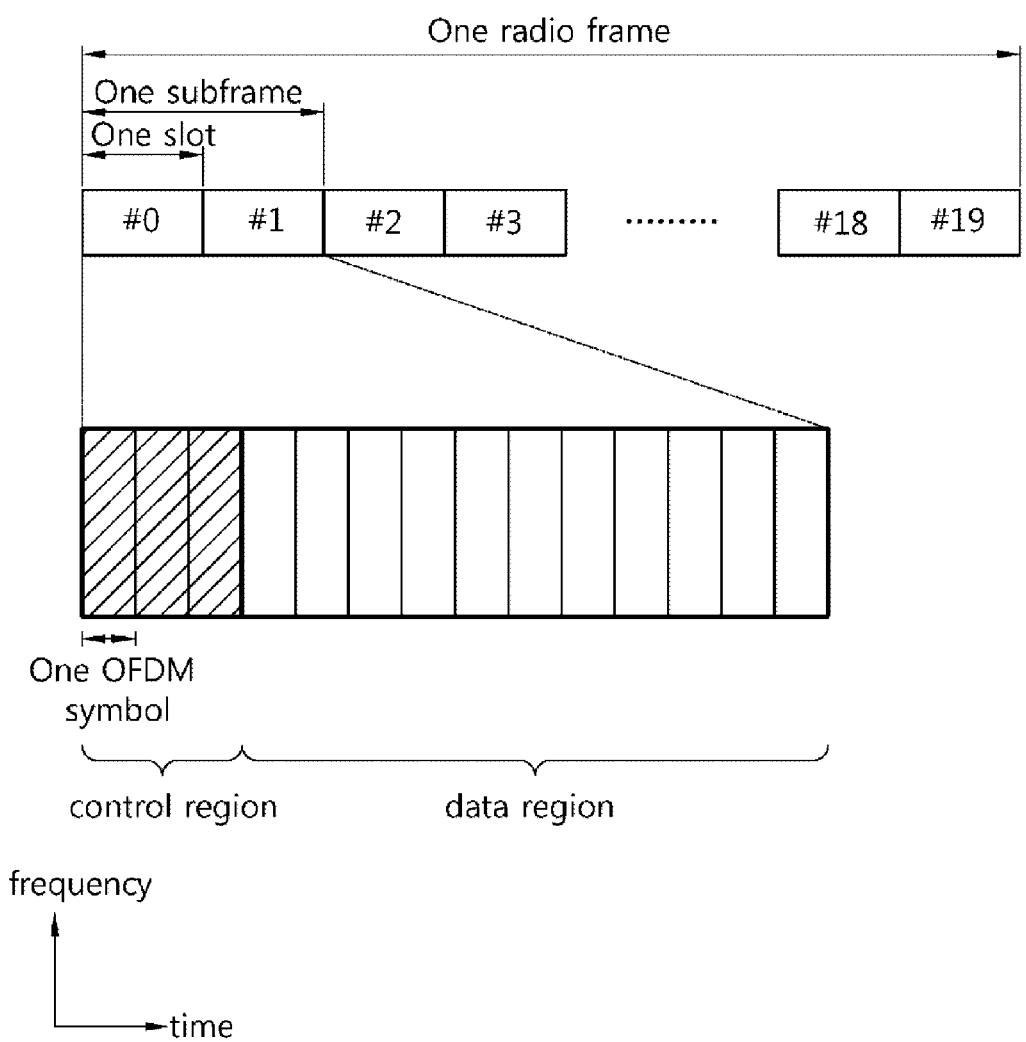
FIG. 2 shows a downlink radio frame structure in 3rd generation partnership project (3GPP) long term evolution (LTE).

FIG. 2 shows a downlink radio frame structure in 3rd generation partnership project (3GPP) long term evolution (LTE). The section 6 of 3GPP TS 36.211 V8.7.0 (2009-05) "Evolved Universal Terrestrial Radio Access (E-UTRI); Physical Channels and Modulation (Release 8)" may be incorporated herein.

As shown in FIG. 1, a radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMI) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMI) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V8.7.0, in case of a normal CP, one slot includes 7 OFDM symbols, and in case of an extended CP, one slot includes 6 OFDM symbols.

A resource block (RII) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first three OFDM symbols of a 1st slot in the subframe. However, the number of OFDM symbols included in the control region may vary. A physical downlink control channel (PDCCH) and other control channels are allocated to the control region, and a physical downlink shared channel (PDSCH) is allocated to the data region.

As disclosed in 3GPP TS 36.211 V8.7.0, the 3GPP LTE classifies a physical channel into a data channel and a control channel. Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

Unlike the PDCCH, the PCFICH is transmitted by using a fixed PCFICH resource of the subframe, without having to perform blind decoding.

The PHICH carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a 2nd slot of a 1st subframe of a radio frame. The PBCH carries system information necessary for communication between the UE and the BS. The system information transmitted through the PBCH is referred to as a master information block (MIII). In comparison thereto, system information transmitted on the PDCCH indicated by the PDCCH is referred to as a system information block (SIII).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

The 3GPP LTE uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

The BS determines a PDCCH format according to DCI to be transmitted to the UE, attaches a CRC to the DCI, and masks a unique identifier (referred to as a radio network temporary identifier (RNTI)) to the CRC according to an owner or usage of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of the available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a UE having a good DL channel state can use one CCE in PDCCH transmission. A UE having a poor DL channel state can use 8 CCEs in PDCCH transmission.

A control channel consisting of one or more CCEs performs interleaving in an REG unit, and is mapped to a physical resource after performing cyclic shift based on a cell identifier (ID).

Now, maintaining of a UL time alignment in 3GPP LTE will be described.

To decrease an interference caused by UL transmission between UEs, it is important for a BS to maintain a UL time alignment of the UEs. The UE may be located in any area in a cell. A UL signal transmitted by the UE may arrive to the BS at a different time according to the location of the UE. A signal arrival time of a UE located in a cell edge is longer than a signal arrival time of a UE located in a cell center. On the contrary, the signal arrival time of the UE located in the cell center is shorter than the signal arrival time of the UE located in the cell edge.

To decrease the interference between the UEs, the BS needs to perform scheduling so that UL signals transmitted by the UEs in the cell can be received every time within a boundary. The BS has to properly adjust transmission timing of each UE according to a situation of each UE. Such an adjustment is called a time alignment maintenance.

A random access procedure is one of methods for managing the time alignment. The UE transmits a random access preamble to the BS. The BS calculates a time alignment value for advancing or delaying transmission timing of the UE on the basis of the received random access preamble. In addition, the BS transmits a random access response including the calculated time alignment value to the UE. The UE updates the transmission timing by using the time alignment value.

In another method, the BS receives a sounding reference signal from the UE periodically or randomly, calculates the time alignment value of the UE by using the sounding reference signal, and reports a MAC control element (CE) to the UE.

The time alignment value is information sent by the BS to the UE to maintain uplink time alignment. A timing alignment command indicates this information.

Since the UE has mobility in general, the transmission timing of the UE varies depending on a moving speed, a location, or the like of the UE. Therefore, the time alignment value received by the UE is preferably valid during a specific time period. For this, a time alignment timer is used.

When the time alignment is updated after receiving the time alignment value from the BS, the UE starts or restarts the time alignment timer. The UE can perform UL transmission only when the time alignment timer is running. A value of the time alignment timer may be reported by the BS to the UE by using system information or an RRC message such as a radio bearer reconfiguration message.

When the time alignment timer expires or when the time alignment timer does not run, the UE does not transmit any uplink signal except for the random access preamble under the assumption that time alignment is not achieved between the BS and the UE.

Figure 3:
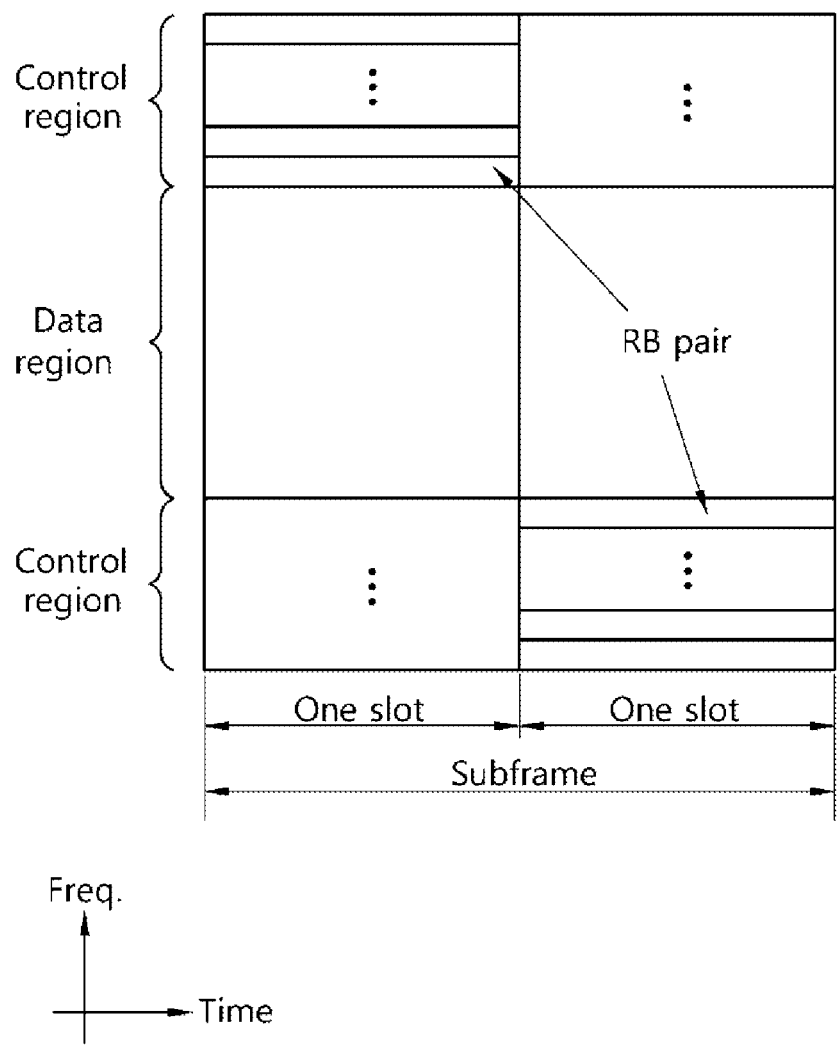
FIG. 3 shows the structure of an uplink subframe in 3rd generation partnership project (3GPP) long term evolution (LTE).

FIG. 3 shows the structure of an uplink subframe in 3rd generation partnership project (3GPP) long term evolution (LTE).

Referring FIG. 3, an uplink subframe may be divided into a control region and a data region in the frequency domain. A physical uplink control channel (PUCCH) for transmitting uplink control information is allocated to the control region. A physical uplink shared channel (PUCCH) for transmitting data is allocated to the data region. If indicated by a higher layer, the user equipment may support simultaneous transmission of the PUCCH and the PUSCH.

The PUSCH is mapped to a uplink shared channel (UL-SCH), a transport channel. Uplink data transmitted on the PUSCH may be a transport block, a data block for the UL-SCH transmitted during the TTI. The transport block may be user information. Or, the uplink data may be multiplexed data. The multiplexed data may be data obtained by multiplexing the transport block for the UL-SCH and control information. For example, control information multiplexed to data may include a channel quality indicator (CQI), a precoding matrix indicator (PMI), an HARQ, a rank indicator (RI), or the like. Or the uplink data may include only control information.

The following description is about a PUCCH.

The PUCCH for one UE is allocated in an RB pair. RBs belonging to the RB pair occupy different subcarriers in each of a 1st slot and a 2nd slot. A frequency occupied by the RBs belonging to the RB pair allocated to the PUCCH changes at a slot boundary. This is called that the RB pair allocated to the PUCCH is frequency-hopped at a slot boundary. Since the UE transmits UL control information over time through different subcarriers, a frequency diversity gain can be obtained. In the figure, m is a location index indicating a logical frequency-domain location of the RB pair allocated to the PUCCH in the subframe.

FIG. 4 shows a concept of a communication system by an information theory.

As illustrated in FIG. 4, in a wireless communication system including a wireless communication apparatus of Alice, a wireless communication apparatus of Bob, and a wireless communication apparatus of Charlie, It is very important for Alice to secretly transmit data so that an only desired receiver (Bob) may receive the data without being overheard by other users (Eve).

Figure 5:
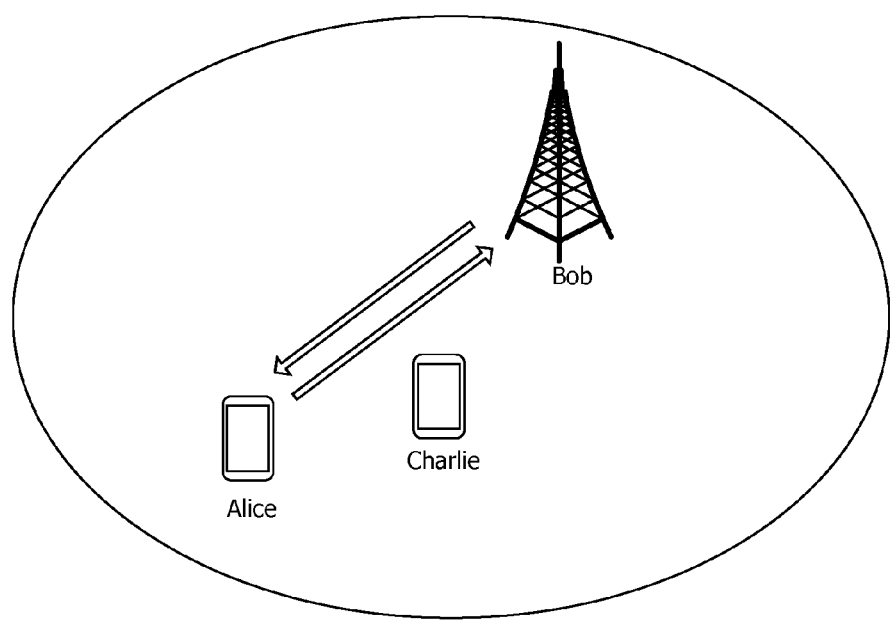
FIG. 5 shows an example in which the concept of a communication system shown in FIG. 4 is applied to a mobile system.

FIG. 5 shows an example in which the concept of a communication system shown in FIG. 4 is applied to a mobile system.

As seen with reference to FIG. 5, when Alice and Charlie are wireless terminals and Bob is the base station, data which Alice and Bob transmit and receive may be overheard by Charlie.

Therefore, in the wireless communication system, it is important to secretly transmit data so as to prevent data from being overheard (received and decoded) by an undesired receiver.

To this end, in an existing method which is primarily used up to now, data is encoded/decoded by using an encryption/decryption theory (cryptography). To this end, both a transmitter and a receiver should have a secret key and to this end, the system performs secret key management.

However, it may be difficult or very complicated that the wireless communication system performs the secret key management. Further, transmission of secret data by the encoding theory has a limit that the transmission cannot provide perfect secret.

In order to solve the problems, physical layer security has been studied a lot in recent years.

Among physical layer security schemes, the most attracting attention is to use an information theory. For example, according to the information theory, it may be proved that there is a coding scheme to become a mutual information amount between Alice and Eve zero. This is mathematically expressed as follows. It is assumed that Xn represents a probability variable indicating a codeword transmitted from Alice and Zn represents a probability variable indicating a codeword received by Eve. The n represents a length of the codeword. In this case, when using the information theory, it may be mathematically proved that there may be a codeword to satisfy following conditions.

$$\lim_{n\to\infty} I(X^n; Z^n) = 0 \tag{1}$$

where I(•) represents a mutual information amount. However, according to the information theory, although it may be mathematically proved that there is a codeword to satisfy the above condition, how to actually configure the codeword is not suggested. Some research results up to now do not represent a scheme to configure the codeword.

In other type physical layer security scheme according to the information theory, when channel capacity between Alice and Bob is greater than that between Alice and Eve, a data transmission rate in Alice is controlled to be not greater than a channel capacity between Alice and Bob, and the transmission rate is controlled to be greater than a channel capacity between Alice and Eve. In this manner, if the transmission is achieved, a length of the codeword is extremely great (n→∞), a block decoding error probability converges to zero, and a decoding error probability in Eve converges to 1. In this case, the decoding error probability means that a code to be decoded from a receiving end is different from a transmission code. This scheme is advantageous to use an existing codeword (for example, turbo codeword or LDPC codeword). However, the scheme is disadvantageous that the above result is obtained only when a length of the codeword is extremely long (n→∞) but the above result is not obtained when the length of the codeword is finite with n. That is, when a channel codeword having a finite length n is given in a real system, although a transmission rate in Alice is not greater than a channel capacity between Alice and Bob but the transmission rate is greater than a channel capacity between Alice and Eve, an error probability in Bob is not exactly zero and an error probability in Eve is not exactly 1.

Therefore, the present invention has been made in an effort to solve the above-described problems associated with prior art, and provides a method capable of securely transmitting data in a wireless communication system without being overheard by a third user. The present invention is further aimed at increasing an (block or bit) error probability in a overhearer greater than a certain given reference value and reducing a decoding error probability. In order to accomplish the above objects, an existing codeword may be used. In particular, a codeword having a finite length may be used. System model.

1. System Model

A code book having M codewords of a length n is considered. When the code book is used, a transmission rate R is expressed as follows.

$$R = \frac{\ln M}{n} \text{(nats/time slot)} \quad (2)$$

A $x_i$ represents a data symbol to be transmitted, a $h_b$ represents a channel between Alice and Bob, and $h_e$ represents a channel between Alice and Eve. It is assumed that the channel is slowly changed so that the channel is fixed for a time slot of a code length n. In this case, a received signal $y_{b,i}$ in Bob and a received signal $y_{e,i}$ in Eve are given as follows.

$$y_{b,i} = h_b x_i + \eta_{b,i}, \ i=1,\ldots,n \quad (3)$$

$$y_{e,i} = h_e x_i + \eta_{e,i}, \ i=1,\ldots,n \quad (4)$$

the $\eta_{b,i}$ represents a white noise in Bob, and is mathematically modeled as a Gaussian probability variable so that an average thereof is 0 and a variance is $\sigma_b^2$. In the same manner, the $\eta_{e,i}$ represents a white noise in Eve, and is mathematically modeled as a Gaussian probability variable so that an average thereof is 0 and a variance is $\sigma_e^2$.

When a channel h ($h_b$ or $h_e$) is given, a channel change probability $f(y_i|x_i, h)$ is expressed as follows.

$$f(y_i|x_i, h) = \frac{1}{\pi\sigma^2} \exp\left(-\frac{|y_i - hx_i|^2}{\sigma^2}\right) \quad (5)$$

Further, it is assumed that q(x) represents a probability distribution function of a transmitted signal $x_i$. If the $x_i$ is a discrete value, the q(x) becomes a probability mass function (PMF). If the $x_i$ is a continuous value, the q(x) becomes a probability density function (PDF). A transmission power p is expressed as follows.

$$p = \mathbb{E}[|x_i|^2] \quad (6)$$

Suppose that $C_b$ represents a channel capacity between Alice and Bob, and $C_e$ represents a channel capacity between Alice and Eve. In this case, the $C_b$ and $C_e$ are set as follows.

$$C_b = \ln\left(1 + \frac{p|h_b|^2}{\sigma_b^2}\right) \quad (7)$$

$$C_e = \ln\left(1 + \frac{p|h_e|^2}{\sigma_e^2}\right) \quad (8)$$

If a result of Information Theory and Reliable Communications of R. Gallager is used, when $R<C_b$, a block decoding error probability $P_{err}^b(R)$ in Bob has a limited upper limit as follows.

$$P_{err}^b(R) \le P_{err}^{U,b}(R) \quad (9)$$

$$P_{err}^{U,b}(R) := \min_{0<\rho\le 1} P_{err}^{U,b}(R, \rho) \quad (10)$$

In addition, when $R>C_e$, a block decoding error probability $P_{err}^e(R)$ in Eve has a limited lower limit as follows.

$$P_{err}^e(R) \ge P_{err}^{L,e}(R) \quad (11)$$

$$P_{err}^{L,e}(R) := \max_{-1<\rho<0} P_{err}^{L,e}(R, \rho'). \quad (12)$$

In the above equations, the $P_{err}^{U,b}(R,\rho)$ and the $P_{err}^{L,e}(R,\rho')$ are given by $$P_{err}^{U,b}(R,\rho) = \exp(-nE_b(R,\rho)) \quad (13)$$

$$P_{err}^{L,e}(R,\rho') = 1 - \exp(-nE_e(R,\rho')) \quad (14)$$

The $E_b(R,\rho)$ and $E_e(R,\rho')$ are given by $$E_b(R,\rho) = E_b^0(\rho) - \rho R \quad (15)$$

$$E_e(R,\rho') = E_e^0(\rho') - \rho' R \quad (16)$$

In the equation (15), the $E_b^0(\rho)$ is given by $$E_b^0(\rho) = \quad (17)$$

$$\begin{cases} -\ln \int_{y_b} \left[\sum_x q(x) f(y_b|x, h_b)^{\frac{1}{1+\rho}}\right]^{1+\rho} dy_b, & \text{for discrete } x \text{ and continuous } y_b \\ -\ln \int_{y_b} \left[\int_x q(x) f(y_b|x, h_b)^{\frac{1}{1+\rho}} dx\right]^{1+\rho} dy_b, & \text{for continuous } x \text{ and continuous } y_b \end{cases}$$

In the same manner, $E_e^0(\rho')$ is given by $$E_e^0(\rho') = \quad (18)$$

$$\begin{cases} -\ln \int_{y_e} \left[\sum_x q(x) f(y_e|x, h_e)^{\frac{1}{1+\rho'}}\right]^{1+\rho'} dy_e, & \text{for discrete } x \text{ and continuous } y_e \\ -\ln \int_{y_e} \left[\int_x q(x) f(y_e|x, h_e)^{\frac{1}{1+\rho'}} dx\right]^{1+\rho'} dy_e, & \text{for continuous } x \text{ and continuous } y_e \end{cases}$$

The $E_b^0(\rho)$ and the $E_e^0(\rho')$ have following characteristics.

$$\max_{0<\rho\le 1} E_b(R,\rho) > 0 \text{ if } R < C_b \text{ and} \quad (19)$$

$$\max_{0<\rho\le 1} E_b(R,\rho) = 0 \text{ if } R \ge C_b$$

$$\max_{-1<\rho'<0} E_e(R,\rho') > 0 \text{ if } R > C_e \text{ and} \quad (20)$$

$$\max_{-1<\rho'<0} E_e(R,\rho') = 0 \text{ if } R \le C_e.$$

When a probability distribution q(x) of data $x_i$ transmitted for Alice is given as Gaussian distribution, the $E^0_b(\rho)$ and the $E^0_e(\rho')$ are given by:

$$E^0_b(\rho) = -\ln\left(1 + \frac{p|h_b|^2}{\sigma_b^2(1+\rho)}\right)^{-\rho}, \ 0 < \rho < 1 \quad (21)$$

$$E^0_e(\rho') = -\ln\left(1 + \frac{p|h_e|^2}{\sigma_e^2(1+\rho')}\right)^{-\rho'}, \ -1 < \rho' < 0. \quad (22)$$

2. Transmission Rate Setting

The present invention ensures that a upper limit of a decoding error probability in Bob is less than a preset limit value in order to ensure reliability of data transmission from Alice to Bob.

$$P_{err}^{U,b}(R) \leq \mathcal{P}_{err}^{U,b}, \text{ if } h_b \text{ known} \quad (23)$$

$$\mathbb{E}_{h_b}[P_{err}^{U,b}(R)] \leq \bar{\mathcal{P}}_{err}^{U,b}, \text{ if } h_b \text{ unknown} \quad (24)$$

$0 < \mathcal{P}_{err}^{U,b} \leq 1$ and $0 < \bar{\mathcal{P}}_{err}^{U,b} \leq 1$ are a system parameter to adjust a decoding reliability in Bob.

Further, the present invention ensures that a lower limit of a decoding error probability in Eve is greater than a preset value so that data of Alice is not decoded.

$$P_{err}^{L,e}(R) \geq \mathcal{P}_{err}^{L,e}, \text{ if } h_e \text{ known} \quad (25)$$

$$\mathbb{E}_{h_e}[P_{err}^{L,e}(R)] \geq \bar{\mathcal{P}}_{err}^{L,e}, \text{ if } h_e \text{ unknown} \quad (26)$$

The $0 \leq P_{err}^{U,b} < 1$ and $0 \leq \bar{P}_{err}^{U,b} < 1$ are a system parameter so that data is not overheard.

2.1 when Alice Knows Channel Information of Bob and Eve

Consider that Alice knows channel information $h_b$ of Bob and channel information $h_e$. Suppose that $\check{\rho}(R)$ and $\check{\rho}'(R)$ are optimal values of given $\rho$ and $\rho'$.

$$\check{\rho}(R) = \arg\min_{0 < \rho \leq 1} P_{err}^{U,b}(R, \rho) \quad (27)$$

$$\check{\rho}'(R) = \arg\max_{-1 < \rho' < 0} P_{err}^{L,e}(R, \rho') \quad (28)$$

where the $\check{\rho}(R)$ is a function depending on R, n, p, $$\frac{|h_b|^2}{\sigma_e^2},$$

$P_{err}^{U,b}$, and the $\check{\rho}'(R)$ is a function depending on R, n, p, $$\frac{|h_e|^2}{\sigma_e^2},$$

$P_{err}^{L,b}$, and the $\check{\rho}'(R)$.

First, a maximum value $R_{max}$ of the transmission rate in order to ensure decoding reliability in Bob.

$$R_{max} = \arg\max_{0 \leq R < C_b} R \quad (29)$$

subject to $$P_{err}^{U,b}(R) \leq \mathcal{P}_{err}^{U,b}. \quad (30)$$

When the transmission rate R is increased, since the $P_{err}^{U,b}(R)$ is increased, the maximum transmission rate $R_{max}$ should satisfy a condition $P_{err}^{U,b}(R) = \mathcal{P}_{err}^{U,b}$. In this case, a following condition is satisfied.

$$R_{max} = \frac{1}{n\bar{\rho}(R_{max})}\ln\mathcal{P}_{err}^{U,b} + \ln\left(1 + \frac{p|h_b|^2}{\sigma_b^2(1+\rho(R_{max}))}\right) \quad (31)$$

$$< \frac{1}{n\bar{\rho}(R_{max})}\ln\mathcal{P}_{err}^{U,b} + C_b \quad (32)$$

$$\leq C_b. \quad (33)$$

That is, the maximum transmission rate $R_{max}$ should be less than a channel capacity $C_b$ of Bob. A difference $\Delta_b$ between the channel capacity and the maximum transmission rate may be a positive number.

$$\Delta_b = C_b - R_{max} \quad (34)$$

$$= -\frac{1}{n\bar{\rho}(R_{max})}\ln\mathcal{P}_{err}^{U,b} + \ln\left(\frac{1 + \frac{p|h_b|^2}{\sigma_b^2}}{1 + \frac{p|h_b|^2}{\sigma_b^2(1+\bar{\rho}(R_{max}))}}\right) \quad (35)$$

$$\overset{(a)}{>} -\frac{1}{n\bar{\rho}(R_{max})}\ln\mathcal{P}_{err}^{U,b} \quad (36)$$

$$\overset{(b)}{\geq} 0. \quad (37)$$

In the above condition (a), an equal sign is satisfied when p=0. In the condition (b), the equal sign is satisfied only when $P_{err}^{U,b}=1$. In the above equation, when the n is reduced or $P_{err}^{U,b}$ is reduced, the difference $\Delta_b$ is increased. In particular, when the $P_{err}^{U,b}$ is reduced, $$-\frac{1}{n\rho(\check{R}_{max})}\ln P_{err}^{U,b}$$

is increased, thereby increasing the difference $\Delta_b$. In no conditions with respect to decoding reliability in Bob are given (that is, $P_{err}^{U,b}=1$), the $$-\frac{1}{n\check{\rho}(R_{max})}\ln P_{err}^{U,b}$$

become zero. Further, when n is increased, the $$-\frac{1}{n\check{\rho}(R_{max})}\ln P_{err}^{U,b}$$

is reduced so that the difference $\Delta_b$ is reduced.

A minimum transmission rate $R_{min}$ to ensure stability is obtained based on following conditions.

$$R_{min} = \arg \min_{R>C_e} R \quad (38)$$

subject to $$P_{err}^{L,e}(R) \geq \mathcal{P}_{err}^{L,e}. \quad (39)$$

When the transmission rate R is reduced, since $P_{err}^{L,e}(R)$ is reduced, the minimum transmission rate $R_{min}$ satisfies a condition $P_{err}^{L,e}(R) = P_{err}^{L,e}$. Accordingly, a following condition is satisfied.

$$R_{min} = \frac{1}{n\check{\rho}'(R_{min})} \ln(1 - \mathcal{P}_{err}^{L,e}) + \ln\left(1 + \frac{p|h_e|^2}{\sigma_e^2(1+\check{\rho}'(R_{min}))}\right) \quad (40)$$

$$> \frac{1}{n\check{\rho}'(R_{min})} \ln(1 - \mathcal{P}_{err}^{L,e}) + C_e \quad (41)$$

$$\geq C_e. \quad (42)$$

That is, the minimum transmission rate $R_{min}$ should be greater than channel capacity $C_e$ of Eve. A difference $\Delta_e$ between the channel capacity and the maximum transmission rate may be a positive number.

$$\Delta_e = R_{min} - C_e \quad (43)$$

$$= \frac{1}{n\check{\rho}'(R_{min})} \ln(1 - \mathcal{P}_{err}^{L,e}) + \ln\left(\frac{1 + \frac{p|h_e|^2}{\sigma_e^2(1+\check{\rho}'(R_{min}))}}{1 + \frac{p|h_e|^2}{\sigma_e^2}}\right) \quad (44)$$

$$\stackrel{(c)}{>} \frac{1}{n\check{\rho}'(R_{min})} \ln(1 - \mathcal{P}_{err}^{L,e}) \quad (45)$$

$$\stackrel{(d)}{\geq} 0. \quad (46)$$

In the above condition (c), an equal sign is satisfied when $p=0$. In the condition (d), the equal sign is satisfied only when $P_{err}^{L,b}=0$.

In the above equation, when the n is reduced or $P_{err}^{L,e}$ is increased, the difference $\Delta_e$ is increased. In particular, when the $P_{err}^{L,e}$ is increased, $$-\frac{1}{n\rho'(\check{R}_{min})}(1 - \ln P_{err}^{L,e})$$

is increased, thereby increasing the difference $\Delta_e$. In no conditions with respect to stability are given (that is, $P_{err}^{L,e}=0$), the $$-\frac{1}{n\rho'(\check{R}_{min})} \ln P_{err}^{L,e}$$

become zero. Further, when n is increased, the $$-\frac{1}{n\rho'(\check{R}_{min})}(1 - \ln P_{err}^{L,e})$$

is reduced so that the difference $\Delta_e$ is reduced.

As a result, Alice should adjust the transmission rate R between $R_{min}$ and $R_{max}$.

$$R_{min} \leq R \leq R_{max} \quad (47)$$

2.2 Case where Alice Knows Channel Information of Bob but does not Know Channel Information of Eve Consider that Alice knows channel information $h_b$ of Bob but does not know channel information $h_e$ of Eve. In this case, Alice cannot calculate a real error probability $P_{err}^{L,e}(R)$ in Eve. Instead, Alice can calculate an average $\overline{P}_{err}^{L,e}(R)$ of error probability in Eve.

$$\overline{P}_{err}^{L,e}(R) = \min_{-1<\rho'<0} \overline{P}_{err}^{L,e}(R, \rho') \quad (48)$$

Where, $$\overline{P}_{err}^{L,e}(R, \rho') = \mathbb{E}_{h_e}[P_{err}^{L,e}(R, \rho')] \quad (49)$$

$$= 1 - \exp(-n\overline{E}_e(R, \rho')). \quad (50)$$

In the above equation, $$\overline{E}_e(R, \rho') = \overline{E}_0^e(\rho') - \rho' R \quad (51)$$

where $$\overline{E}_0^e(\rho') = -\ln \mathbb{E}_{h_e}\left[\left(1 + \frac{p(h_b)|h_e|^2}{\sigma_e^2(1+\rho')}\right)^{-\rho'}\right], \quad -1 < \rho' < 0. \quad (52)$$

It is assumed that $\overline{\rho}'(R)$ indicates an optimal value of $\overline{\rho}'$ obtained as follows.

$$\overline{\rho}'(R) = \arg \max_{-1<\rho'<0} \overline{P}_{err}^{L,e}(R, \rho'). \quad (53)$$

In this case, a minimum transmission rate $\overline{R}_{min}$ is obtained as follows.

$$\overline{R}_{min} = \arg \min_{R>C_e} R \quad (54)$$

subject to $$\overline{P}_{err}^{L,e}(R) \geq \mathcal{P}_{err}^{L,e} \quad (55)$$

In this case, the $\overline{R}_{min}$ satisfies a following condition.

$$\overline{R}_{min} = \frac{1}{n\overline{\rho}'(R_{min})} \ln(1 - \mathcal{P}_{err}^{L,e}) - \frac{1}{\overline{\rho}'(R_{min})} \ln \mathbb{E}_{h_e}\left[\left(1 + \frac{p|h_e|^2}{\sigma_e^2(1+\overline{\rho}'(R_{min}))}\right)^{-\overline{\rho}'(R_{min})}\right] \quad (56)$$

As a result, Alice should adjust the transmission rate R between $\overline{R}_{min}$ and $R_{max}$.

$$\overline{R}_{min} \leq R \leq R_{max}. \quad (57)$$

2.3 Case where Alice does not Know Both of Channel Information of Bob and Channel Information of Eve Consider that Alice does not know both of channel information $h_b$ of Bob and channel information $h_e$ of Eve. In this case, Alice cannot calculate a real error probability $P_{err}^{L,e}(R)$ in Eve and a real error probability $P_{err}^{U,b}(R)$ in Eve. Accordingly, Alice obtains an average of the above error probabilities so that averages satisfy given conditions. The average $\breve{P}_{err}^{L,e}(R)$ of error probability in Eve is obtained by the equation (48) and an average $\breve{P}_{err}^{U,b}(R)$ of error probability in Bob is obtained as follows.

$$\overline{P}_{err}^{U,b}(R) = \min_{0<\rho\leq 1} \overline{P}_{err}^{U,b}(R,\rho) \tag{58}$$

where $$\overline{P}_{err}^{U,b}(R,\rho) = \mathbb{E}_{h_b}[P_{err}^{U,b}(R,\rho)] \tag{59}$$

$$= \exp(-n\overline{E}_b(R,\rho)). \tag{60}$$

In the above equation, $$\overline{E}_b(R,\rho) = \overline{E}_0^b(\rho) - \rho R \tag{61}$$

Where $$\overline{E}_0^b(\rho) = -\ln \mathbb{E}_{h_b}\left[\left(1 + \frac{p|h_b|^2}{\sigma_b^2(1+\rho)}\right)^{-\rho}\right]. \tag{62}$$

It is assumed that $\overline{\rho}'(R)$ indicates an optimal value of $\overline{\rho}'$ obtained as follows.

$$\overline{\rho}(R) := \arg\min_{0<\rho\leq 1} \overline{P}_{err}^{U,b}(R,\rho). \tag{63}$$

In this case, a maximum transmission rate $\overline{R}'$ max is obtained as follows.

$$\overline{R}_{max} = \arg\max_{0<R<C_b} R \tag{64}$$

subject to $$\overline{P}_{err}^{U,b}(R) \leq \mathcal{P}_{err}^{U,b} \tag{65}$$

In this case, the $\overline{R}_{max}$ satisfies a following condition.

$$\overline{R}_{max} = \tag{66}$$

$$\frac{1}{n\overline{\rho}(\overline{R}_{max})} \ln \mathcal{P}_{err}^{U,b} - \frac{1}{\overline{\rho}(\overline{R}_{max})} \ln \mathbb{E}_{h_b}\left[\left(1 + \frac{p|h_b|^2}{\sigma_b^2(1+\overline{\rho}(\overline{R}_{max}))}\right)^{-\overline{\rho}(\overline{R}_{max})}\right].$$

As a result, Alice should adjust the transmission rate R between the $\overline{R}_{min}$ and the $\overline{R}_{max}$.

$$\overline{R}_{min} \leq R \leq \overline{R}_{max}. \tag{67}$$

3. Optimization of Transmission Power

3.1 Optimization of Transmission I: Maximization of Transmission Rate

Consider that Alice transmits data with $R=R_{max}$ which is a maximum transmission rate. A first power optimization of the present invention is to optimize power to maximize $E[R_{max}]$.

3.1.1 Case where Alice Knows Channel Information of Bob and Eve

When channel information $h=(h_b, h_e)$ is known to Alice, the transmission power is optimized to maximize $E[R_{max}]$.

$$\max_{p(h)} \mathbb{E}_h[R_{max}] \tag{68}$$

subject to $$p(h) \geq 0 \tag{69}$$

$$\mathbb{E}_h[p(h)] \leq \overline{p}_{av} \tag{70}$$

In this case, power p(h) is a function of channel h.

Unfortunately, it is very difficult to directly solve an optimization problem. In order to solve the problem, the present invention maximize $E_h[C_b]$ which is an upper limit of $E_h[R_{max}]$ (when n is increased, the upper limit becomes similar to a real value). A solution when an upper limit is used is given by a known water-filling power control scheme as follows.

$$p_{wf}(h_b) = \left(\frac{1}{\lambda} - \frac{\sigma_b^2}{|h_b|^2}\right)^+ \tag{71}$$

In this case, $(x)^+ = \max(x, 0)$. In real transmission, only a case of $R_{max} \geq R_{min}$, data transmission is possible. Accordingly, an optimal power control scheme is given as follows.

$$p_{opt}(h) = \begin{cases} p_{wf}(h_b), & \text{if } R_{max} \geq R_{min} \\ 0, & \text{otherwise} \end{cases} \tag{72}$$

In this case, $\lambda$ is determined to satisfy a following condition.

$$\mathbb{E}_h[p_{opt}(h)] = \overline{p}_{av}. \tag{73}$$

Another transmission scheme sets a transmission rate as a minimum value if possible as $R=R_{min}$. A remaining part $(C_b-R)$ except for the transmission rate from a channel capacity of Bob may be transmitted using a security channel code represented from an existing information theory. In this case, as a result, a full transmission rate becomes $R+(C_b-R)=C_b$. Accordingly, an optimal power control scheme is the given water-filling scheme.

3.1.2 Case where Channel Information of Bob is Known to Alice but Channel Information of Eve is Known to Alice In this case, the optimal power control scheme changes $R_{min}$ to $\overline{R}_{min}$ and is given by $$p_{opt}(h_b) = \begin{cases} p_{wf}(h_b), & \text{if } R_{max} \geq \overline{R}_{min} \\ 0, & \text{otherwise} \end{cases} \tag{74}$$

In this case, $\lambda$ is determined to satisfy a following condition.

$$\mathbb{E}_{h_b}[p_{opt}(h_b)] = \overline{p}_{av}. \tag{75}$$

In this case, $\overline{p}_{av}$ represents an allowable average power.

3.2 Power Optimization II: Minimization of Outage Probability

A second power optimization scheme of the present invention optimizes power so that an outage probability in Bob is minimized when a transmission rate R is fixed.

3.2.1 Case where Alice Knows Channel Information of Bob and Eve

Since channel information of Bob is given to Alice, Alice may previously calculate an error probability in Bob. In this case, if the error probability in Bob is greater than a certain reference value $P_{err}^{U,b}$, a transmission outage is declared, and Alice stops transmission (That is, transmission power is set to zero). Power optimization is to minimize a declared probability of an outage $(P_{err}^{U,b}(R,\rho) > P_{err}^{U,b})$. Further, an error probability in Eve is set to be greater than a certain reference value $P_{err}^{L,e}$. As a result, optimal power is determined to solve a following optimization problem.

$$\min_{p(h), 0 < \rho \leq 1, -1 < \rho' < 0} Pr(P_{err}^{U,b}(R, \rho) > \mathcal{P}_{err}^{U,b}) \quad (76)$$

subject to $p(h) \geq 0$ with probability one $\quad (77)$ $\mathbb{E}_h[p(h)] \leq \overline{p}_{av} \quad (78)$ $P_{err}^{L,e}(R, \rho') \geq \mathcal{P}_{err}^{L,e}$ with probability one.

A solution of the above optimization problem may be given by $$p_{opt}(h) = \begin{cases} p_{min}(h_b, \check{\rho}), & \text{if } p_{min}(h_b, \check{\rho}) \leq p_{max}(h_e, \check{\rho}') \\ & \text{and } |h_b|^2 \geq z_{opt}. \\ 0, & \sigma_b^2(1+\check{\rho})\left((\mathcal{P}_{err}^{U,b})^{-\frac{1}{N\check{\rho}}} e^R - 1\right) \\ & \text{if } p_{min}(h_b, \check{\rho}) \leq p_{max}(h_e, \check{\rho}') \\ & \text{and } |h_b|^2 < z_{opt}. \\ 0, & \sigma_b^2(1+\check{\rho})\left((\mathcal{P}_{err}^{U,b})^{-\frac{1}{N\check{\rho}}} e^R - 1\right) \\ & \text{if } p_{min}(h_b, \check{\rho}) > p_{max}(h_e, \check{\rho}') \end{cases} \quad (79)$$

where $$p_{min}(h_b, \check{\rho}) = \frac{\sigma_b^2(1+\check{\rho})}{|h_b|^2}\left((\mathcal{P}_{err}^{U,b})^{-\frac{1}{N\check{\rho}}} e^R - 1\right) \quad (80)$$

$$p_{max}(h_e, \check{\rho}') = \frac{\sigma_e^2(1+\check{\rho}')}{|h_e|^2}\left(1 - (\mathcal{P}_{err}^{L,e})^{-\frac{1}{N\check{\rho}'}} e^R - 1\right). \quad (81)$$

In the above equation, $\check{\rho}$, $\check{\rho}'$, $z_{opt}$ are given as follows.

$$\check{\rho} = \arg\min_{0 < \rho \leq 1} (1+\rho)\left((\mathcal{P}_{err}^{U,b})^{-\frac{1}{n\rho}} e^R - 1\right) \quad (82)$$

$$\check{\rho}' = \arg\min_{-1 < \rho' < 0} (1+\rho')\left((1 - \mathcal{P}_{err}^{L,e})^{-\frac{1}{n\rho'}} e^R - 1\right) \quad (83)$$

$$z_{opt} = \max\{z: z \geq 0, \mathbb{E}_h[p_{opt}(h, \check{\rho}, \check{\rho}')] \leq \overline{p}_{av}\}. \quad (84)$$

3.2.2 Case where Channel Information of Bob is Known to Alice but Channel Information of Eve is not Known to Alice When real channel information of Eve is not given, in order to optimize power, the power is optimized using an average instead of a real error probability of Eve.

$$\min_{p(h_b), 0 < \rho \leq 1, -1 < \rho' < 0} Pr(P_{err}^{U,b}(R, \rho) > \mathcal{P}_{err}^{U,b}) \text{ subject to} \quad (85)$$

$p(h_b) \geq 0 \quad (86)$ $\mathbb{E}_{h_b}[p(h_b)] \leq \overline{p}_{av} \quad (87)$ $\mathbb{E}_{h_e}[P_{err}^{L,e}(R, \rho')] \geq \mathcal{P}_{err}^{L,e} \quad (88)$ where, $\check{P}_{err}^{L,e}$ represents a system parameter to adjust security of transmission data.

It is very difficult to directly solve the above problem due to $\mathbb{E}_{h_e}[P_{err}^{L,e}(R,\rho')]$. In order to mathematically solve the above problem, a lower limit $\check{P}_{err}^{L,e}(R,\rho')$ of the $\mathbb{E}_{h_e}[P_{err}^{L,e}(R,\rho')]$ is used. So as to obtain a lower value satisfying $\check{P}_{err}^{L,e}(R,\rho') \leq \mathbb{E}_{h_e}[P_{err}^{L,e}(R,\rho')]$, Jensen's inequality is used as follows.

$$\mathbb{E}_{h_e}\left[\left(1 + \frac{p(h_b)|h_e|^2}{\sigma_e^2(1+\rho')}\right)^{\rho'}\right] \leq \left(1 + \frac{p(h_b)\mathbb{E}_{h_e}[|h_e|^2]}{\sigma_e^2(1+\rho')}\right)^{-\rho'}, \quad (89)$$

$-1 < \rho' < 0$ where, when $0 < \alpha < 1$ and $x > 0$, $(1+x)^\alpha$ is a concave function. Using an inequality, a secure condition $\mathbb{E}_{h_e}[P_{err}^{L,e}(R, \rho')] \geq \check{P}_{err}^{L,e}$ is replaced with a strong secure condition $\check{P}_{err}^{L,e}(R,\rho') \geq \check{P}_{err}^{L,e}$.

$$\check{P}_{err}^{L,e}(R, \rho') = 1 - \exp\left(-n\left\{-\ln\left(1 + \frac{p(h_b)\mathbb{E}_{h_e}[|h_e|^2]}{\sigma_e^2(1+\rho')}\right)^{-\rho'} - \rho' R\right\}\right). \quad (90)$$

A power optimization problem may be solved using the obtained stronger secure condition, and the optimal power is given as follows.

$$p_{opt}(h_b) = \begin{cases} p_{min}(h_b, \check{\rho}), & \text{if } p_{min}(h_b, \check{\rho}) \leq \check{p}_{max}(\check{\rho}') \\ & \text{and } |h_b|^2 \geq z_{opt}. \\ & \sigma_b^2(1+\check{\rho})\left((\mathcal{P}_{err}^{U,b})^{-\frac{1}{N\check{\rho}}} e^R - 1\right) \\ 0, & \text{if } p_{min}(h_b, \check{\rho}) \leq p_{max}(\check{\rho}') \\ & \text{and } |h_b|^2 \geq z_{opt}. \\ & \sigma_b^2(1+\check{\rho})\left((\mathcal{P}_{err}^{U,b})^{-\frac{1}{N\check{\rho}}} e^R - 1\right) \\ 0, & \text{if } p_{min}(h_b, \check{\rho}) > \overline{p}_{max}(\check{\rho}') \end{cases} \quad (91)$$

where, $p_{min}(h_b, \check{\rho})$ is obtained as described in section 3.2.1 and $\check{p}_{max}(\check{\rho}')$ is given as follows.

$$\overline{p}_{max}(\check{\rho}') = \frac{\sigma_e^2(1+\check{\rho}')}{\mathbb{E}_{h_e}[|h_e|^2]}\left(1 - \mathcal{P}_{err}^{L,e}\right)^{-\frac{1}{n\check{\rho}'}} e^R - 1\right). \quad (92)$$

In the above equation, $\check{\rho}$ and $\check{\rho}'$ is obtained as described in section 3.2.1 and the $z_{opt}$ is determined as follows.

$$z_{opt} = \max\{z: z \geq 0, \mathbb{E}_{h_b}[p_{opt}(h_b, \check{\rho}, \check{\rho}')] \leq \overline{p}_{av}\}. \quad (93)$$

3.3 Power Optimization III: Minimization of Bob Error Probability

According to the present invention, a third power optimization scheme minimizes an average error probability in Bob when a transmission rate R is fixed 3.3.1 Case where Alice knows channel information of Bob and Eve An average error probability in Bob is given as follows.

$$\overline{P}_{err}^{U,b}(R) := \max_{0<\rho\le 1} \mathbb{E}_h[P_{err}^{U,b}(R,\rho)]. \tag{94}$$

Power optimization is obtained in a scheme of minimizing a given average error probability.

$$\min_{p(h),0<\rho\le 1,-1<\rho'<1} \overline{P}_{err}^{U,b}(R) \text{ subject to} \tag{95}$$

$$p(h) \ge 0 \text{ with probability one} \tag{96}$$

$$P_{err}^{L,e}(R) \ge \mathcal{P}_{err}^{L,e} \text{ with probability one} \tag{97}$$

$$\mathbb{E}_h[p(h)] \le \overline{p}_{av}. \tag{98}$$

The solution of the optimization problem is given as follows.

$$p_{opt}(h) = \min\left(p_{max}(h_e, \check{\rho}'), \left[\left(\frac{\lambda|h_b|^{2\check{\rho}}}{\check{\rho}\sigma_b^{2\check{\rho}}(1+\check{\rho})}\right)^{-\frac{1}{\check{\rho}+1}} - \frac{\sigma_b^2(1+\check{\rho})}{|h_b|^2}\right]^+\right) \tag{99}$$

where, $p_{max}(h_e, \check{\rho}')$ is given as follows.

$$p_{max}(h_e, \check{\rho}') = \frac{\sigma_e^2(1+\check{\rho})}{|h_e|^2}\left((1-\mathcal{P}_{err}^{L,e})^{-\frac{1}{n\check{\rho}'}} e^R - 1\right). \tag{100}$$

In the above equation, $\check{\rho}'$ is given as follows.

$$\check{\rho}' = \arg\max_{-1<\rho'<0} (1+\rho')\left((1-\mathcal{P}_{err}^{L,e})^{-\frac{1}{n\rho'}} e^R - 1\right) \tag{101}$$

The $\check{\rho}$ is given as follows.

$$\check{\rho} = \arg\max_{0<\rho\le 1}\left(-\ln\mathbb{E}_h\left[\left[1+\frac{p_{opt}(h,\check{\rho},\check{\rho}')|h_b|^2}{\sigma_b^2(1+\rho)}\right]^{-\rho}\right] - \rho R\right). \tag{102}$$

$\lambda$ is determined to satisfy a following condition.

$$\mathbb{E}_h[p_{opt}(h,\check{\rho},\check{\rho}')] = \overline{p}_{av}. \tag{103}$$

3.3.2 Case where Channel Information of Bob is Known to Alice but Channel Information of Eve is not Known to Alice When channel information of Eve is not known to Alice, a power optimization problem is obtained as follows.

$$\min_{p(h_b),0<\rho\le 1,-1<\rho'<0} \overline{P}_{err}^{U,b}(R) \text{ subject to} \tag{104}$$

$$p(h_b, \rho, \rho') \ge 0 \tag{105}$$

$$\overline{P}_{err}^{L,e}(R) \ge \overline{\mathcal{P}}_{err}^{L,e} \tag{106}$$

$$\mathbb{E}_{h_b}[p(h_b, \rho, \rho')] \le \overline{p}_{av} \text{ where,} \tag{107}$$

$$\overline{P}_{err}^{L,e}(R) = \mathbb{E}_{h_e}[P_{err}^{L,e}(R)]$$

A solution of the optimization problem is given as follows.

$$p_{opt}(h_b) = \min\left(\overline{p}_{max}(\check{\rho}'), \left[\left(\frac{\lambda|h_b|^{2\check{\rho}}}{\check{\rho}\sigma_b^{2\check{\rho}}(1+\check{\rho})}\right)^{-\frac{1}{\check{\rho}+1}} - \frac{\sigma_b^2(1+\check{\rho})}{|h_b|^2}\right]^+\right) \tag{108}$$

where, $\overline{p}_{max}(\check{\rho}')$ is given as follows.

$$\overline{p}_{max}(\check{\rho}') = \frac{\sigma_e^2(1+\check{\rho}')}{\mathbb{E}_{h_e}[|h_e|^2]}\left((1-\overline{\mathcal{P}}_{err}^{L,e})^{-\frac{1}{n\check{\rho}'}} e^R - 1\right). \tag{109}$$

$\check{\rho}$, $\check{\rho}'$, and $\lambda$ are obtained as described in section 3.3.1.

4. Asymptotic Error Probability in Bob and Eve and Transmission Stop Probability in Alice when a Length of a Code is Long $(n\to\infty)$ 4.1 Case where Alice Knows Channel Information of Bob and Eve Asymptotic error probability in Bob: if a transmission rate R is set as $R<C_b$, a following condition may be satisfied:

$$\lim_{n\to\infty} P_{err}^b(R) \le \lim_{n\to\infty} P_{err}^{U,b}(R) = 0 \text{ (with probability one).} \tag{110}$$

Asymptotic error probability in Eve: if a transmission rate R is set as $R>C_e$, a following condition may be satisfied.

$$\lim_{n\to\infty} P_{err}^e(R) \ge \lim_{n\to\infty} P_{err}^{L,e}(R) = 1 \text{ (with probability one).} \tag{111}$$

When channels of Bob and Eve are known, the transmission rate R may be set as follows: $C_e<R<C_b$. However, in order to set the R, a condition $C_b>C_e$ should be satisfied. When the $C_b>C_e$ is not satisfied, Alice stops the transmission. A corresponding probability refers to a suspension probability. When the length of a code is long $(n\to\infty)$, asymptotic transmission suspension probability at Alice is given as follows.

$$P_{sus} = Pr(C_e > C_b) \tag{112}$$

$$= Pr\left(\frac{|h_b|^2}{\sigma_b^2} < \frac{|h_e|^2}{\sigma_e^2}\right). \tag{113}$$

4.2 Channel Information of Bob is Known to Alice but Channel Information of Eve is not Known to Alice Since channel information of Bob is known to Alice, Alice may adjust a transmission rate as follows: $R < C_b$. However, since channel information of Eve is not known to Alice, it is not possible to adjust the transmission rate so that a condition $R > C_e$ is satisfied. Accordingly, although a length of the code is extremely long, an error probability in Eve does not converge to 1. Instead, a lower limit of an asymptotic average error probability is limited, which may be mathematically expressed.

$$\lim_{n \to \infty} \bar{P}_{err}^e(R) \geq P_{out}^e(R) \tag{114}$$

where an outage probability $P_{out}^e(R)$ in Eve is given as follows.

$$P_{out}^e(R) = Pr(C_e < R). \tag{115}$$

Based on the above result, the following may be known. In order to increase the asymptotic average error probability, the outage probability $P_{out}^e(R)$ in Eve should be increased.

Further, an asymptotic transmission stop probability in Alice is given as follows.

$$P_{sus}(R) = P_{out}^b(R) \tag{116}$$

where, the $P_{out}^e(R)$ is an outage probability in Bob given as follows.

$$P_{out}^b(R) = Pr(C_b < R). \tag{117}$$

4.3 Case where Channel Information of Bob and Eve is not Known to Alice

When the channel information of Bob is known to Alice, an asymptotic average error probability $\check{P}_{err}^b(R)$ in Bob does not converge to zero, and an upper limit of the value is mathematically limited as follows.

$$\lim_{n \to \infty} \bar{P}_{err}^b(R) \leq P_{out}^b(R). \tag{118}$$

From the result, the following may be known. In order to reduce the asymptotic average error probability $\check{P}_{err}^b(R)$ in Bob, an outage probability $P_{out}^e(R)$ in Bob should be reduced.

When Alice does not know the channel information of Bob or Eve, since $C_b$ and $C_e$ cannot be calculated, data are always transmitted without stopping transmission. That is, an asymptotic transmission stop probability in Alice is zero.

$$P_{SUS}(R) = 0 \tag{119}$$

5. Stable Data Transmission in a Bit Error Probability Aspect

The above embodiment performs transmission rate control, transmission power optimization, and asymptotic block error probability analysis for securely transmitting data in a block error probability aspect. This section considers that a method of securely transmitting data in a bit error probability aspect. When the transmission rate R is greater than a channel capacity C ($R \geq C$), a bit error probability $P_b$ satisfies a following inequality [Ref 3].

$$P_b \geq H_2^{-1}\left(1 - \frac{C}{R}\right) \tag{120}$$

where, $H_2(x) = -x\ln x - (1-x)\ln(1-x)$ is a binary entropy function.

R. E. Blahut, Principles and practice of information theory, Addison Wesley, 1987.

Hereinafter, a system with Alice, Bob, and Eve is described. Further, $P_b$ refers to a lower limit of a bit error probability to be satisfied in Eve. In this case, if $C = C_e$ and $R = C_b$, a lower limit of the bit error probability is limited as follows.

$$P_b \geq \mathcal{P}_b = H_2^{-1}\left(1 - \frac{C_e}{C_b}\right) \tag{121}$$

where it is assumed that the $C_b$ is greater than the $C_e$. The above condition may be expressed as follows.

$$C_e = (1 - H_2(\mathcal{P}_b))C_b. \tag{122}$$

If a Gaussian channel is considered, the $C_b$ and the $C_e$ are given as follows.

$$C_e = \log_2\left(1 + \frac{|h_e|^2}{\sigma_e^2} p(h)\right) \tag{123}$$

$$C_b = \log_2\left(1 + \frac{|h_b|^2}{\sigma_b^2} p(h)\right). \tag{124}$$

5.1 Slowly Changed Channel

It is assumed in this section that a channel is slowly changed so that a channel is fixed for a transmission codeword. When the transmission rate R is too great so that $$R > C_b \log_2\left(1 + \frac{|h_c|^2}{\sigma_b^2} p(h)\right),$$

a reliable outage in Bob is generated, data in Bob is not decoded. Further, when $$C_e = \log_2\left(1 + \frac{|h_c|^2}{\sigma_b^2} p(h)\right) > R(1 - H_2(\mathcal{P}_b)),$$

a decoding error probability in Eve is less than $P_b$. That is, a security outage is generated. When one of the outages is generated, data cannot be reliably and securely transmitted. Accordingly, a probability considering all to two types of outages is an outage probability defined as follows.

$$P_{out} = Pr(C_e > R(1 - H_2(\mathcal{P}b)) \text{ OR } R > C_b) \tag{125}$$

$$= Pr\left(\frac{\log_2\left(1 + \frac{|h_e|^2}{\sigma_e^2} p(h)\right)}{R} > 1 - H_2(\mathcal{P}_b) \text{ OR}\right.$$

$$\left. R > \log_2\left(1 + \frac{|h_b|^2}{\sigma_b^2} p(h)\right)\right)$$

In order to minimize the above outage, transmission power may be optimized as follows.

$$\min_{p(h)} P_{out} \quad (126)$$

subject to $$p(h) \geq 0 \quad (127)$$

$$E[p(h)] \leq \overline{p}_{av}. \quad (128)$$

The solution of the optimization problem is given as follows.

$$p^{opt}(h) = \begin{cases} p_{min}(h_b), & \text{if } p_{min}(h_b) < p_{max}(h_e) \text{ and } |h_b|^2 \geq \frac{\sigma_b^2}{z^{opt}}(2^R - 1) \\ 0, & \text{if } p_{min}(h_b) < p_{max}(h_e) \text{ and } |h_b|^2 < \frac{\sigma_b^2}{z^{opt}}(2^R - 1) \\ 0, & \text{if } p_{min}(h_b) \geq p_{max}(h_e) \end{cases} \quad (129)$$

Where, $z^{opt}$ is given to satisfy a following condition.

$$E[p^{opt}(h)] = \overline{p}_{av}. \quad (130)$$

In the above equation, maximum power $P_{max}(h_e)$ and minimum power $P_{min}(h_b)$ are given as follows.

$$p_{max}(h_e) = \frac{\sigma_e^2}{|h_e|^2}(2^{R(1-H_w(\mathcal{P}_b))} - 1) \quad (131)$$

$$p_{min}(h_b) = \frac{\sigma_b^2}{|h_b|^2}(2^R - 1). \quad (132)$$

5.2 Rapidly Changed Channel

An ergodic situation is assumed that a channel is rapidly changed so that a channel is change for a transmission codeword.

$$\max_{p(h)} R \quad (133)$$

subject to $$p(h) \geq 0 \quad (134)$$

$$E[p(h)] \leq \overline{p}_{av} \quad (135)$$

$$R \leq E\left[\log_2\left(1 + \frac{|h_b|^2}{\sigma_b^2}p(h)\right)\right] \quad (136)$$

$$R \geq \frac{1}{1 - H_2(\mathcal{P}_b)} E\left[\log_2\left(1 + \frac{|h_e|^2}{\sigma_e^2}p(h)\right)\right]. \quad (137)$$

The above optimization problem may be expressed as follows.

$$\max_{p(h)} E\left[\log_2\left(1 + \frac{|h_b|^2}{\sigma_b^2}p(h)\right)\right] \quad (138)$$

subject to $$p(h) \geq 0 \quad (139)$$

$$E[p(h)] \leq \overline{p}_{av} \quad (140)$$

$$\frac{1}{1 - H_2(\mathcal{P}_b)} E\left[\log_2\left(1 + \frac{|h_e|^2}{\sigma_e^2}p(h)\right)\right] \leq E\left[\log_2\left(1 + \frac{|h_b|^2}{\sigma_b^2}p(h)\right)\right]. \quad (141)$$

It is very difficult to solve the above optimization problem due to a final condition. Accordingly, the optimization problem is solved in a high signal-to-noise ratio region by approximating the above problem. In this case, a following condition is satisfied using $E[\log_2(1+x)] = E[\log_2(x)]$ approximation.

$$\frac{1}{1 - H_2(\mathcal{P}_b)}\left(E\left[\log_2\left(\frac{|h_e|^2}{\sigma_e^2}\right)\right] + E[\log_2(p(h))]\right) \leq \quad (142)$$

$$E\left[\log_2\left(\frac{|h_b|^2}{\sigma_b^2}\right)\right] + E[\log_2(p(h))].$$

The above condition may be expressed as follows.

$$E[\log_2(p(h))] \leq \quad (143)$$

$$\frac{1 - H_2(\mathcal{P}_b)}{H_2(\mathcal{P}_b)} E\left[\log_2\left(\frac{|h_b|^2}{\sigma_b^2}\right)\right] - \frac{1}{1 - H_2(\mathcal{P}_b)} E\left[\log_2\left(\frac{|h_e|^2}{\sigma_e^2}\right)\right].$$

Further, a following strong security condition is used for optimization using Jensen's inequality $E[\log_2(p(h))] \leq E[\log_2 E[p(h)]]$.

$$\log_2 E[(p(h))] \leq \quad (144)$$

$$\frac{1 - H_2(\mathcal{P}_b)}{H_2(\mathcal{P}_b)} E\left[\log_2\left(\frac{|h_b|^2}{\sigma_b^2}\right)\right] - \frac{1}{1 - H_2(\mathcal{P}_b)} E\left[\log_2\left(\frac{|h_e|^2}{\sigma_e^2}\right)\right].$$

As a result, the power optimization problem is given as follows.

$$\max_{p(h)} E\left[\log_2\left(1 + \frac{|h_b|^2}{\sigma_b^2}p(h)\right)\right] \quad (145)$$

subject to $$p(h) \geq 0 \quad (146)$$

$$E[p(h)] \leq \min(\overline{p}_{av}, 2^\xi) \quad (147)$$

where $$\xi = \frac{1 - H_2(\mathcal{P}_b)}{H_2(\mathcal{P}_b)} E\left[\log_2\left(\frac{|h_b|^2}{\sigma_b^2}\right)\right] - \frac{1}{1 - H_2(\mathcal{P}_b)} E\left[\log_2\left(\frac{|h_e|^2}{\sigma_e^2}\right)\right]. \quad (148)$$

The above problem is a well-known water-filling problem and a solution thereof is given as follows.

$$p^{opt}(h) = \left(\frac{1}{\lambda} - \frac{\sigma_b^2}{|h_b|^2}\right)^+ \quad (149)$$

where, $\lambda$ is determined to satisfy a following condition.

$$E[p^{opt}(h)] = \min(\overline{p}_{av}, 2^\xi). \quad (150)$$

Effects of the Present Invention

When data are transmitted using a method according the present invention, the block decoding error probability may be limited to a previously defined small value or less in a desired receiver. The block decoding error probability may be limited to a previously defined small value or greater in a undesirable overhearer. In particular, in order to accomplish the object, an existing channel code may be used. In particular, the present invention may limit an error probability in a desired receiver and an error probability in the undesirable overhearer while efficiently using transmission power to the highest degree. That is, while efficiently using transmission power to the highest degree, reliable and stable data may be transmitted to a radio channel without being overheard. In addition, the above scheme is applicable to a block decoding error probability aspect and a bit error probability aspect.

Figure 6:
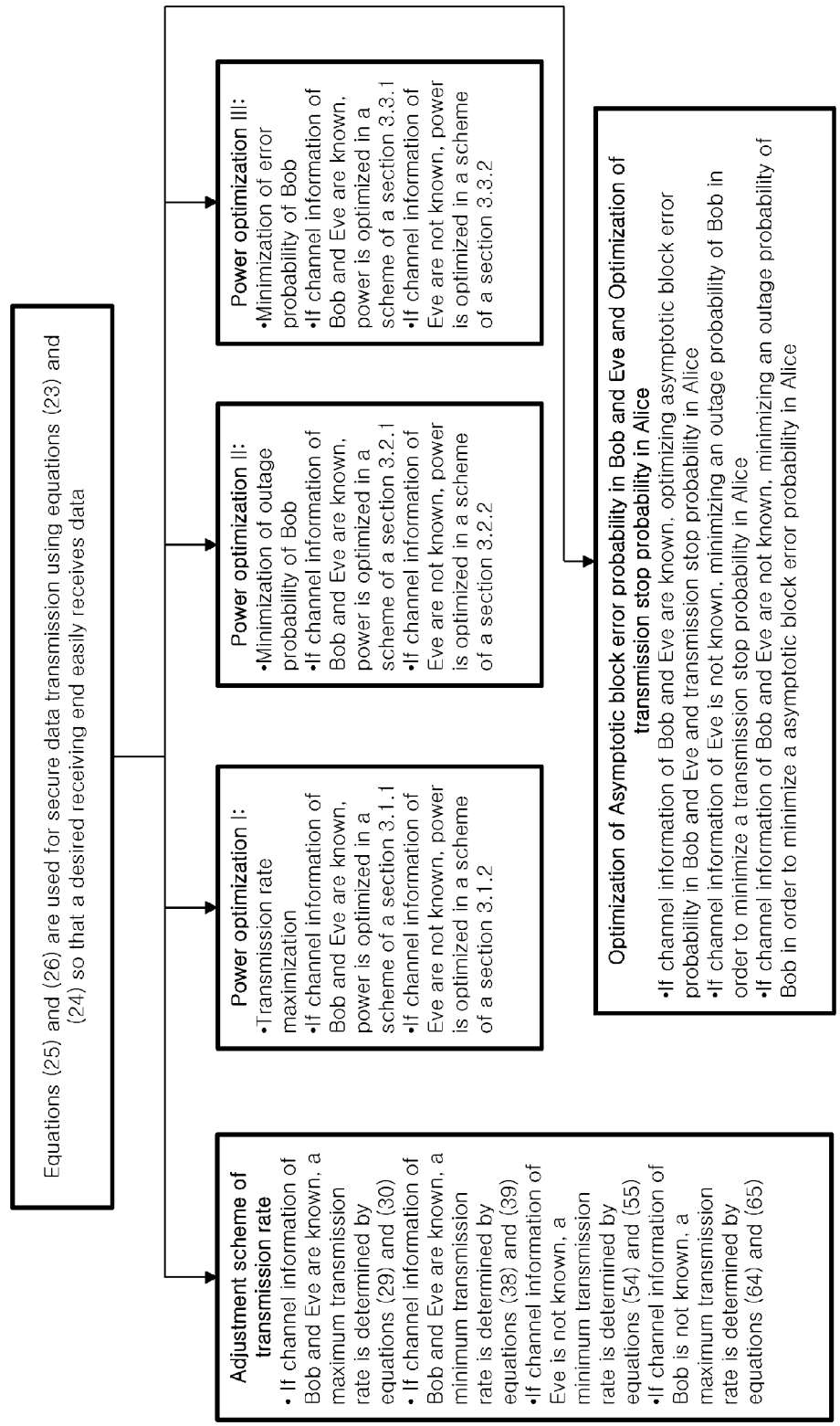
FIG. 6 illustrates a method of securely transmitting wireless data in a block error probability aspect

FIG. 6 illustrates a method of securely transmitting wireless data in a block error probability aspect Referring to FIG. 6, equations (25) and (26) are used for secure data transmission using equations (23) and (24) so that a desired receiving end easily receives data.

Also, for adjustment scheme of transmission rate, if channel information of Bob and Eve are known, a maximum transmission rate is determined by equations (29) and (30). If channel information of Bob and Eve are known, a minimum transmission rate is determined by equations (38) and (39). If channel information of Eve is not known, a minimum transmission rate is determined by equations (54) and (55). If channel information of Bob is not known, a maximum transmission rate is determined by equations (64) and (65)

For power optimization I, the transmission rate is maximized. If channel information of Bob and Eve are known, power is optimized in a scheme of a section 3.1.1. If channel information of Eve are not known, power is optimized in a scheme of a section 3.1.2

For power optimization II, outage probability of Bob is minimized. If channel information of Bob and Eve are known, power is optimized in a scheme of a section 3.2.1. If channel information of Eve are not known, power is optimized in a scheme of a section 3.2.2.

For power optimization III, an error probability of Bob is minimized. If channel information of Bob and Eve are known, power is optimized in a scheme of a section 3.3.1. If channel information of Eve are not known, power is optimized in a scheme of a section 3.3.2

For optimization of Asymptotic block error probability in Bob and Eve and Optimization of transmission stop probability in Alice, if channel information of Bob and Eve are known, optimizing asymptotic block error probability in Bob and Eve and transmission stop probability in Alice. If channel information of Eve is not known, minimizing an outage probability of Bob in order to minimize a transmission stop probability in Alice. If channel information of Bob and Eve are not known, minimizing an outage probability of Bob in order to minimize a asymptotic block error probability in Alice FIG. 7 illustrates a method of securely transmitting wireless data in a bit error probability aspect Referring to FIG. 7, the equation (121) may be used to securely transmit data without being overheard For power optimization, if a channel is slowly changed, power is optimized by equation (126) and (128) in order to minimize an outage probability If a channel is rapidly changed, power is optimized by equation (126) and (128) in order to maximize an outage probability. If a channel is rapidly changed, power is optimized by equation (145) and (147) in order to maximize an outage probability FIG. 8 illustrates a method of securely transmitting wireless data according to the present disclosure.

Figure 8:
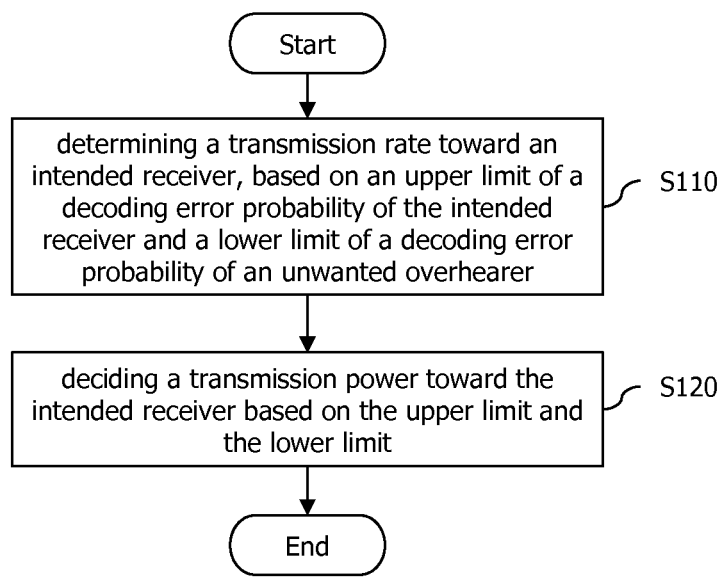
FIG. 8 illustrates a method of securely transmitting wireless data according to the present disclosure.

Referring to FIG. 8, a wireless apparatus (for example, Alice) determines a transmission rate toward an intended receiver, based on an upper limit of a decoding error probability of the intended receiver (Bob) and a lower limit of a decoding error probability of an unwanted overhearer (Eve).

Then, the wireless apparatus (for example, Alice) decides a transmission power toward the intended receiver based on the upper limit and the lower limit. Here, if the upper limit is lower than the lower limit, the transmission toward the intended receiver is not performed. Also, if the upper limit is greater than the lower limit, the transmission power is decided based on a water-filling power control scheme.

The upper limit of the decoding error probability of the intended receiver may be lower than a first threshold value.

The transmission power toward the intended receiver may be decided in consideration of a minimization of an outage probability of the unwanted overhearer.

The embodiments of the present invention described above may be implemented through a variety of means. For example, the embodiments of the present invention may be implemented by hardware, a firmware, software or a combination thereof.

Figure 9:
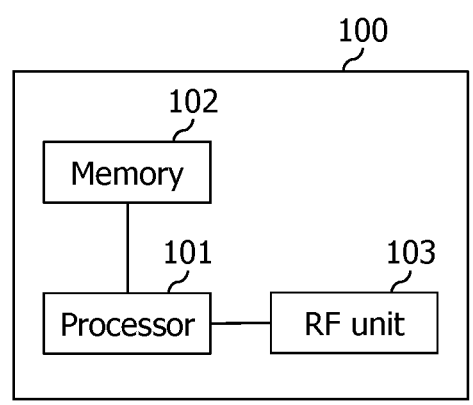
FIG. 9 is a block diagram showing a wireless communication system to implement an embodiment of the present invention.

FIG. 9 is a block diagram showing a wireless communication system to implement an embodiment of the present invention.

A terminal 100 includes a processor 101, memory 102, and a radio frequency (RF) unit 103. The memory 102 is connected to the processor 101 and configured to store various information used for the operations for the processor 101. The RF unit 103 is connected to the processor 101 and configured to send and/or receive a radio signal. The processor 101 implements the proposed functions, processed, and/or methods. In the described embodiments, the operation of the terminal may be implemented by the processor 101.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for deciding transmission power to securely transmit data, the method comprising:
   determining an upper limit of a decoding error probability of an intended receiver and a lower limit of a decoding error probability of an unwanted receiver;
   adjusting a transmission rate toward the intended receiver based on the determined upper limit and the determined lower limit; and
   deciding a transmission power toward the intended receiver based on the determined upper limit and the determined lower limit,
   wherein the transmission toward the intended receiver is not performed when the determined upper limit is lower than the determined lower limit,
   wherein the transmission power is decided based on a water-filling power control scheme when the determined upper limit is greater than the determined lower limit,
   wherein the transmission rate toward an intended receiver is adjusted by the following equations:

$P_{err}^{b}(R) \leq P_{err}^{U,b}(R)$ $P_{err}^{U,b}(R) := _{0 < \rho \leq 1}^{min} P_{err}^{U,b}(R,\rho)$ such that the determined upper limit is lower than a first threshold value,
   wherein $P_{err}^{b}(R)$ is a block decoding error probability of the intended receiver,
   wherein $P^{U}_{err}{}^{b}(R)$ is a block decoding error probability of the determined upper limit of the intended receiver,
   wherein the transmission rate toward the unwanted receiver is adjusted by the following equations:

$P_{err}^{e}(R) \geq P_{err}^{L,e}(R)$ $P_{err}^{L,e}(R) := \max_{-1 < \rho < 0}{}^{max} P_{err}^{L,e}(R,\rho')$.

such that the determined lower limit is greater than a second threshold value,
   wherein $P_{err}^{e}(R)$ is a block decoding error probability of the unwanted receiver,
   wherein $P^{L}_{err}{}^{e}(R)$ is a block decoding error probability of the determined lower limit of the unwanted receiver, and
   wherein a maximum value of the transmission rate toward the intended receiver is determined by considering a decoding reliability in the intended receiver.

2. The method of claim 1, wherein the transmission power toward the intended receiver is decided in consideration of a minimization of an outage probability of the unwanted receiver.

3. A wireless apparatus for deciding transmission power to securely transmit data, the wireless apparatus comprising:
   a transceiver; and
   a processor connected to the transceiver and configured to:
   determine an upper limit of a decoding error probability of an intended receiver and a lower limit of a decoding error probability of an unwanted receiver;
   adjust a transmission rate toward the intended receiver based on the determined upper limit and the determined lower limit; and
   decide a transmission power toward the intended receiver based on the determined upper limit and the determined lower limit,
   wherein the transmission toward the intended receiver is not performed when the determined upper limit is lower than the determined lower limit,
   wherein the transmission power is decided based on a water-filling power control scheme when the determined upper limit is greater than the determined lower limit,
   wherein the transmission rate toward an intended receiver is adjusted by the following equations:

$P_{err}^{b}(R) \leq P_{err}^{U,b}(R)$ $P_{err}^{U,b}(R) := _{0 < \rho \leq 1}^{min} P_{err}^{U,b}(R,\rho)$ such that the determined upper limit is lower than a first threshold value,
   wherein $P_{err}^{b}(R)$ is a block decoding error probability of the intended receiver,
   wherein $P^{U}_{err}{}^{b}(R)$ is a block decoding error probability of the determined u er limit of the intended receiver,
   wherein the transmission rate toward the unwanted receiver is adjusted by the following equations:

$P_{err}^{e}(R) \geq P_{err}^{L,e}(R)$ $P_{err}^{L,e}(R) := _{-1 < \rho < 0}^{max} P_{err}^{L,e}(R,\rho')$ such that the determined lower limit is greater than a second threshold value,
   wherein $P_{err}^{e}(R)$ is a block decoding error probability of the unwanted receiver,
   wherein $P^{L}_{err}{}^{e}(R)$ is a block decoding error probability of the determined lower limit of the unwanted receiver, and
   wherein a maximum value of the transmission rate toward the intended receiver is determined by considering a decoding reliability in the intended receiver.

4. The wireless apparatus of claim 3, wherein the transmission power toward the intended receiver is decided in consideration of a minimization of an outage probability of the unwanted receiver.

* * * * *